Nov. 18, 1947. H. H. PLATT 2,430,948
ROTOR BLADE
Filed May 25, 1944
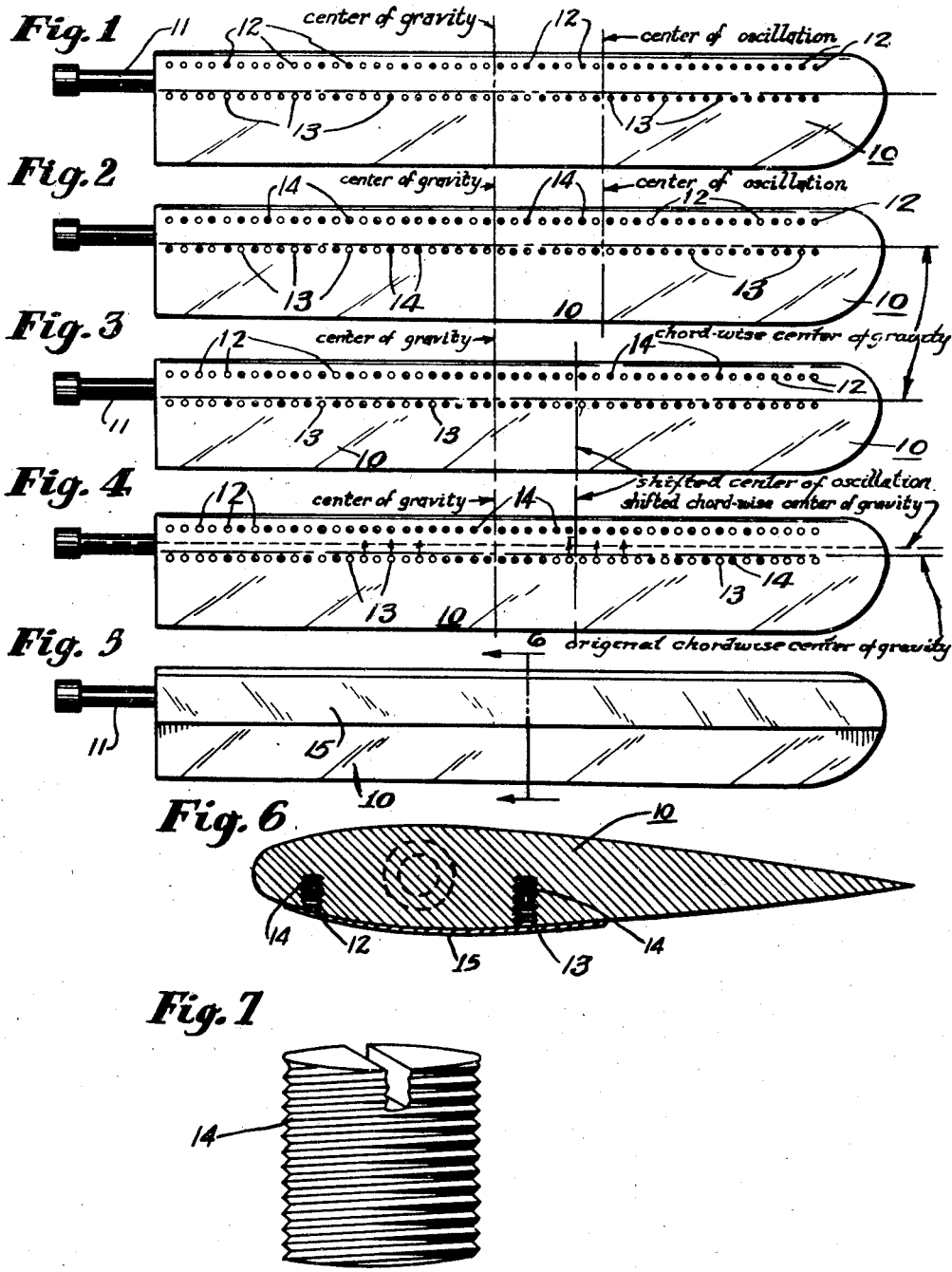
INVENTOR.
Haviland H. Platt
BY
Attorney Patented Nov. 18, 1947

2,430,948

UNITED STATES PATENT OFFICE 2,430,948

ROTOR BLADE

Haviland H. Platt, New York, N. Y., assignor, by mesne assignments, to McDonnell Aircraft Corporation, St. Louis, Mo., a corporation of Maryland Application May 25, 1944, Serial No. 537,272

1 Claim. (Cl. 170—159)

The present invention relates to rotor blades, especially for rotative-winged aircraft, and it relates more particularly to certain new and useful improvements in the art of balancing the several blades of a rotor.

An object of the present invention is to provide a new and useful rotor blade for rotative-winged aircraft. Another object of the present invention is to provide rotor blades which can quickly and easily be balanced so that all of the blades of a rotor are uniform in weight characteristics.

Other objects and advantages of the present invention are apparent in the following detailed description, appended claim and accompanying drawings.

In balancing rotor blades for aircraft rotors, and particularly for articulated rotors, it has been found that the blades of any one rotor must have minimum variation in mass and in mass distribution in order to avoid objectionable roughness and vibration of the aircraft and control members during flight.

Thus, the individual blades of a single rotor must be closely alike in the following characteristics of mass and mass distribution:

1. The total weight of each of the blades must be the same.
2. The positions of the centers of gravity of the several blades span-wise must be the same.
3. The positions of the centers of oscillation of the several blades span-wise must be the same.
4. The positions of the centers of gravity of the several blades chord-wise must be the same.
5. The centers of gravity must be located along the chords in precise relationship to the location of the centers of pressure of the blade airfoil section.

When the individual blades of a single rotor deviate from requirements "1" and "2" above, the combined center of gravity of the rotor is shifted out of the axis of rotation, thereby causing vibration of the aircraft due to primary unbalance.

Since the blades of an articulated rotor are mounted with freedom to swing in the plane of rotation, deviation from requirement "3" above, namely, dissimilarity in the locations of the centers of oscillation span-wise causes pendular oscillation to be at varying frequencies. The blades then get out of phase in their swings thereby leading to periodical displacement of the combined center of gravity. The result is a vibration of the entire aircraft.

The importance of the location of the center of gravity chord-wise, results from the fact that the centrifugal force of a rotating blade is in operation balanced against the aerodynamic lift. Any deviation from requirement "4" above, namely, any discrepancy between the points of application of these two forces chord-wise produces a moment tending to twist the blades. Since the blades are necessarily quite flexible, this moment causes them to twist with consequent change in pitch angle. If these moments are different among the several blades of a single rotor, each will produce a different force on the control attachments to the blades. This results in a tendency to tilt the swash-plate in a wobbling oscillation which, in turn, leads to the type of oscillation of the control elements commonly known as "stick wobble."

Moreover, the deviation from requirement "4" above, results in the transmission to the structure of the aircraft of an oscillating force, and thereby leads to a vibration of the machine as a whole.

Even if the center of gravity is the same in all the blades (both span-wise and chord-wise), the rotor will not operate with the desired smoothness and balance if there is any deviation from requirement "5" above, namely, if the center of gravity chord-wise is not in coincidence with the center of lift which is located usually approximately one-fourth of the chord from the leading edge.

That is, if the center of gravity varies chord-wise from the center of lift, a uniform twist of all the blades results. While this does not directly cause vibration, it has been found in practice, that, under some circumstances, it leads to torsional flutter of the blades which is reflected in an extremely unpleasant vibration of both the control stick and the entire aircraft and that, under other circumstances, it causes deviations from true pitch which act greatly to the detriment of performance and control of the aircraft.

It has been found impractical to control the manufacture of blades with sufficient accuracy to ensure the necessary uniformity among the several blades of a single rotor.

As a result, a great deal of difficulty has been encountered in the past in properly balancing the several blades of a single rotor. Considerable time and effort have been required, in the past, to secure a sufficient degree of balance especially where repairs or replacements have become necessary at locations at which the usual equipment of an assembling plant or home base has not been available.

Accordingly, the present invention contemplates the provision of means for quickly and easily varying the total weight, the span-wise center of gravity, the span-wise center of oscillation and the chord-wise center of gravity of individual blades so that the blades of a single rotor can be made uniform in the characteristics of mass and mass distribution discussed hereinabove.

Generally speaking, the present invention contemplates a rotor blade which, by itself, has a total weight somewhat less than the final weight desired, and which is provided with means for receiving a plurality of relatively small balancing weights—the balancing weights being shiftable both span-wise and chord-wise of the blade to permit the individual blades of a single rotor to be matched up as to the characteristics discussed hereinabove.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a plan view of the bottom side of a rotor blade of one embodiment of the present invention as it appears before any of the balancing weights has been installed.

Figure 2 represents a view generally similar to that of Figure 1 but showing the appearance of the blade after sufficient balancing weights have been installed to bring the weight of the blade up to the desired value—the weights being arranged symmetrically span-wise so as not to vary the original center of gravity or center of oscillation of the blade.

Figure 3 represents a view generally similar to those of Figures 1 and 2 but showing the appearance of the blade after the balancing weights have been shifted span-wise from the position of Figure 2 so that they are bunched nearer the center of gravity of the blade so that the center of oscillation of said blade is moved inward from its original value—the center of gravity remaining unchanged.

Figure 4 represents a view generally similar to those of Figures 1 to 3, but showing the appearance of the blade after some of the balancing weights have been shifted forward chord-wise to move the chord-wise center of gravity forward to correspond to the center of lift—the span-wise positions of the balancing weights being left unchanged so that the span-wise center of gravity and center of oscillation remain at the same values as indicated in Figure 3.

Figure 5 represents a view generally similar to those of Figures 1 to 4 but showing the final appearance of the blade after a protective cover or strip has been applied to the underside of said blade.

Figure 6 represents a cross-sectional view generally along the line 6—6 of Figure 5.

Figure 7 represents a perspective view, on an enlarged scale, of one of the balancing weights shown in Figures 2, 3 and 4.

In one embodiment of the present invention, I may provide a rotor blade 10 having a supporting spar 11 of conventional construction. The spar 11 is adapted for connection to the hub of a rotor by conventional means (not shown) giving the blade freedom to swing both vertically and horizontally relative to said hub—that is, freedom to flap and freedom to lag.

For example, my co-pending application Serial No. 493,042, filed July 1, 1943, shows means for mounting a rotor blade upon the hub of the rotor whereby the blade is given freedom to flap, freedom to lag, and freedom to change pitch. However, the present invention is not limited in respect to the mode of attachment of the blade to the rotor hub and any conventional type of connection suitable for use with articulated rotors is contemplated.

Since the rotor includes a plurality (generally 3) of such blades, I provide means for adjusting the total mass and the mass distribution of each of said blades to a common value.

In the embodiment of Figure 1, I may provide two span-wise-extending rows of holes or sockets 12 and 13 preferably upon the underside of said blade 10—the forward row of holes 12 being located somewhat ahead of the center of pressure line of said blade and the rearward row of holes 13 being located somewhat behind said center of pressure line.

The holes or sockets may be threaded as shown in Figure 6 to permit quick insertion and removal of a plurality of relatively small balancing weights 14 which, as shown in Figure 7, may be in the form of externally-screw-threaded headless bolts.

The holes or sockets 12 and 13 extend upwardly within the blade 10 as can be seen particularly in Figure 6.

The blade 10 is made to have a mass somewhat less than the final desired mass of the blades as installed on the rotor.

In balancing a set of blades for installation upon a rotor, the several blades are first weighed and sufficient balancing weights 14 are assigned to each blade to bring it up to the desired total weight, which is sufficiently greater than the bare weight of the heaviest blade to allow a surplus of balancing weights for distributional adjustment. The maximum number of weights is, in any case, somewhat less than the number of holes or sockets 12 and 13.

By means of two scales or by knife-edged balancing against a standard blade or weight, the span-wise center of gravity locations of the several blades are brought into harmony by inserting the balancing weights 14 at appropriately varying distances from the blade tips.

In Figure 2, for purposes of simplicity, the balancing weights 14 are shown as being evenly distributed along the span of the blade 10. That is, it is assumed, for purposes of illustration, that the center of span-wise gravity of the blade 10 was originally correct so that, when the weights 14 are added as in Figure 2, their symmetrical relationship to the original center of gravity left the latter unchanged.

It is to be understood, however, that where the original span-wise center of gravity of the blade 10 is not correct, the distribution of the weights (instead of being symmetrical as in Figure 2) would be unsymmetrical relative to the original center of gravity and would be such as to shift it to the desired position.

It should be noted that the center of oscillation (which is approximately two-thirds of the way out along the span) of the blade 10, is not shifted when the balancing weights 14 are disposed symmetrically span-wise as in Figure 2.

As the next step, the several blades 10 may be mounted on any suitable apparatus for determining the span-wise position of their respective centers of oscillation—as, for example, a support from which the blades may be swung as pendulums.

The several blades are then readily brought into uniformity in this respect by moving the balancing weights from one hole to another evenly on either side of the center of gravity.

That is, where it is desired to move the center of oscillation span-wise inwards from its original value, the balancing weights are bunched inward nearer the center of gravity and farther from the ends of the blade. When, on the other hand, it is desired to move the center of oscillation span-wise outward, the balancing weights 14 are moved outward on either side of the center of gravity and towards the ends of the blade.

In Figure 3, for purposes of illustration I have shown a bunching of the weights (that is, a moving of some of the weights equally on either side toward the center of gravity) to produce a span-wise inward shift of the center of oscillation. It is apparent that, if instead some of the weights were shifted equally span-wise outward on either side of the center of gravity, the center of oscillation would be moved outward from the original value shown in Figure 2.

Care must be taken, in any case, to see that, in shifting the center of oscillation, the weights are moved equally in both directions so as not to displace their span-wise combined center of gravity.

After the foregoing operations have been completed, the only remaining requirement is the correction of the chord-wise location of the centers of gravity of the several blades—that is, the determination of the chord-wise centers of gravity of the several blades and the chord-wise shifting of the balancing weights 14 to make the chord-wise centers of gravity uniform and to make them conform to the centers of pressure of the blades.

This adjustment may, if desired, be approximated statically by suitable apparatus using weight scales. It has been found in practice, however, that a sufficiently accurate adjustment can be obtained only by rotating the blades, either on the aircraft itself, or upon a rotatable testing spindle—the weights being shifted chord-wise between runs until a suitable smooth running condition is attained.

During the adjustment runs mentioned last above, the holes may be covered with thin adhesive tape, or the like, to prevent the disturbance of air-flow thereby.

After completion of the adjustments, the holes 12 and 13 may be permanently sealed by "doped" or cemented-on-cloth tapes 15 as shown in Figures 5 and 6.

Instead of employing the cloth tapes 15, I may close the holes 12 and 13 by puttying or the like.

One advantage of my present invention resides in the fact that the final finish (that is, the closing off of the holes 12 and 13) requires the addition of so little extra weight that the balance previously attained is not materially disturbed thereby.

If desired, many of the holes 12 and 13 may be initially omitted if suitable material is provided for drilling them out if and when needed during the adjustment operations described hereinabove.

The balancing weights may be made in other forms. Thus, for example, the weights 14 may be conically-threaded screws which can be screwed into the blade at the places indicated by the various adjustment operations. In this case, the pre-formed holes may be omitted from the blade.

Furthermore, the shifting of the weights may be achieved by other means than that of removing and replacing the screws. For example, some of the screws may be inserted transversely into the leading edge so that screwing them further in or out alters the chord-wise balance, while other screws are in that case inserted in span-wise disposed apertures for the two span-wise adjustments. Alternatively also, the weights may be made otherwise than as screws and adapted to slide in suitable slots or to be removed and inserted in spaced receptacles.

While alternatively the balancing weights may be inserted into the top surface of the blade, I prefer to employ the under surface of the blade for this purpose, not only because the weights are then more readily accessible when the blades are installed on the aircraft, but also because the lower surfaces of the blades are known to be less important aero-dynamically than the upper surfaces, so that any slight disturbance of the smoothness of the blade surfaces thereby will have minimum effect upon the efficiency of operation of the blades.

Any of the known types of blade construction may be employed if provision is made for retaining the weights. Thus, for example, if the blade is of molded plastic having a relatively thick wall, the openings 12 and 13 may be tapped directly into the wall of the blade.

If the blade is provided with a relatively thin skin of cloth or metal stretched over the conventional ribs, etc., suitable span-wise-extending backing strips may be provided underneath the skin into which the holes 12 and 13 may be drilled or into which the balancing weights may be screwed or otherwise fastened directly.

The form, size and spacing of the balancing weights may vary widely. It is also possible to employ many specific types of attachment between the balancing weights and the blades.

The present invention permits the production of standard blades for rotating-winged aircraft which are generally identical and interchangeable with all other blades of the same general type and size. That is, as described hereinabove, the present invention permits the production of rotor blades which all have identical total weights, span-wise and chord-wise centers of gravity, and centers of oscillation.

Thus, a rotor blade produced according to the present invention can be shipped in final adjusted form so that it is ready for installation on an aircraft without further balancing or weight-adjusting operations.

Should any adjustments be necessary in the field before installation (due to variations in the other rotor blades of the set), such adjustments will be minor in character and can be effected after the blade has been installed on the rotor. That is, when the rotor blade of the present invention is received in the field it can be installed forthwith upon the rotor. The rotor can then be turned for test purposes to determine whether there is any flutter or other undesirable vibration and, if so, some of the balancing weights can be shifted quickly and easily to eliminate this undesirable condition.

This illustrates the great superiority of the present construction over conventional rotor blades heretofore employed in which the balancing of a set of blades has always been an intricate and time-consuming operation which can be done only by specially skilled men using intricate testing machines.

That is, the balancing of individual rotor blades has heretofore always been considered as more or less of an art—each individual blade presenting its own problems and receiving individual attention.

By the present invention, on the other hand, standard rotor blades having generally identical characteristics of mass and mass distribution can be produced at a factory or the like and can be shipped to various assembly plants, air fields, and even to individual owners of aircraft, for direct installation with little, if any, final adjustment necessary.

Due to inequalities of fabrication the loci of the centers of gravity of the blade sections do not in practice always lie in a straight line as shown. With the present invention inequalities of this kind can be corrected by moving the balance weights non-uniformly so as to compensate.

The present invention may be embodied in other specific forms without departing from the spirit or essential attributes thereof, and it is therefore desired that the present embodiment be considered in all respects as illustrative and not restrictive, reference being had to the appended claim rather than to the foregoing description to indicate the scope of the invention.

Having thus described the invention, what I claim as new and desire to protect by Letters Patent is:

For use on rotating-wing aircraft, a standard rotor blade having pre-determined mass and having pre-determined span-wise and chord-wise centers of gravity and having pre-determined center of oscillation, the bare weight of said blade being somewhat less than the pre-determined mass value, said blade having a plurality of relatively small holes formed on the surface thereof, said holes being disposed in a pair of rows extending span-wise generally parallel to each other and being spaced apart chord-wise, one of said rows being disposed in front of the chord-wise center of gravity and the other of said rows being disposed to the rear of the chord-wise center of gravity, and a plurality of relatively small countersunk balancing weights detachably affixed within some of said holes, each of said weights being individually shiftable from hole to hole, both span-wise and chord-wise, thereby to permit adjustment of the span-wise and chord-wise centers of gravity and the center of oscillation to the pre-determined values.

HAVILAND H. PLATT.

REFERENCES CITED

The following references are of record in the file of this patent:

UNITED STATES PATENTS

| Number | Name | Date |
| --- | --- | --- |
| 2,076,090 | Meyers | Apr. 6, 1937 |
| 1,903,817 | Johnson | Apr. 18, 1933 |
| 2,111,975 | Larson | Mar. 22, 1938 |
| 1,970,435 | Sharp | Aug. 14, 1934 |
| 1,369,399 | Christensen | Feb. 22, 1921 |
| 2,340,133 | Martin | Jan. 25, 1944 |

FOREIGN PATENTS

| Number | Country | Date |
| --- | --- | --- |
| 420,322 | Great Britain | Nov. 29, 1934 |
| 538,698 | Great Britain | Aug. 13, 1941 |